Nov. 10, 1970     E. W. STONE     3,539,300

BODY FLUID COLLECTOR AND SEPARATOR HAVING IMPROVED FLOW RATE

Filed Oct. 23, 1967     4 Sheets-Sheet 1

INVENTOR
ELLERY W. STONE

BY Stowell & Stowell

ATTORNEYS

Nov. 10, 1970   E. W. STONE   3,539,300
BODY FLUID COLLECTOR AND SEPARATOR HAVING IMPROVED FLOW RATE
Filed Oct. 23, 1967   4 Sheets-Sheet 2
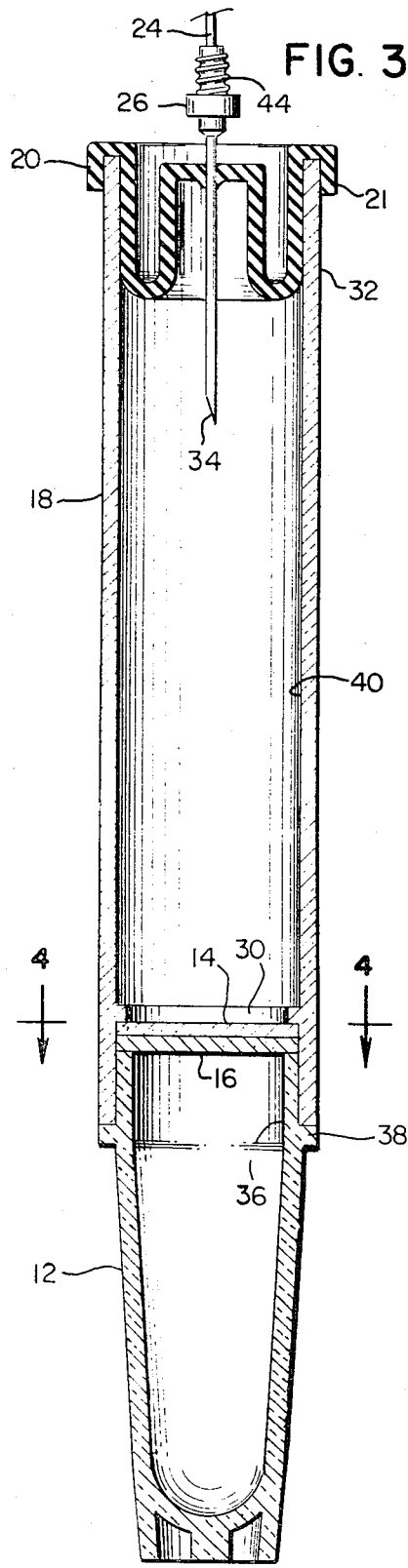
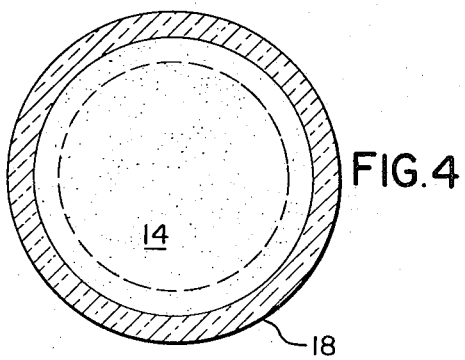
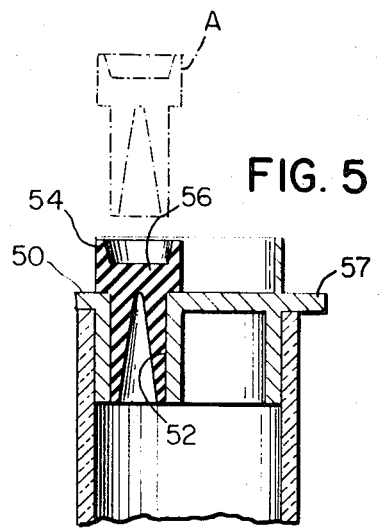
INVENTOR
ELLERY W. STONE
BY *Stowell & Stowell*
ATTORNEYS

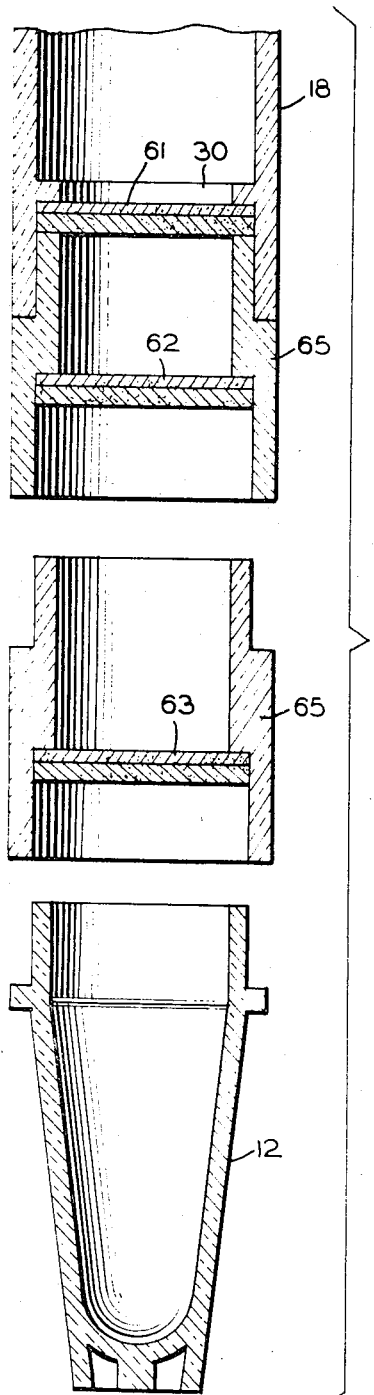

Nov. 10, 1970 — E. W. STONE — 3,539,300
BODY FLUID COLLECTOR AND SEPARATOR HAVING IMPROVED FLOW RATE

INVENTOR
ELLERY W. STONE

BY

ATTORNEYS

United States Patent Office 3,539,300
Patented Nov. 10, 1970

3,539,300
BODY FLUID COLLECTOR AND SEPARATOR HAVING IMPROVED FLOW RATE
Ellery W. Stone, Cohasset, Mass., assignor, by mesne assignments, to Schering Corporation, Bloomfield, N.J., a corporation of New Jersey
Filed Oct. 23, 1967, Ser. No. 677,196
Int. Cl. B01d 25/08, 35/06; G01n 1/14
U.S. Cl. 23—253                                15 Claims

ABSTRACT OF THE DISCLOSURE

Diagnostic body fluid collector and analytical sample separator including an evacuated body fluid collecting tube and an evacuated analytical sample cup. The collecting tube and the sample cup are physically separated from each other by one or more selectively permeable barriers through which only a portion of the collected fluid will pass. The assembly also includes a hollow conduit for directing body fluids into the body fluid collecting tube and means for expediting the separation of the analytical sample by eliminating or substantially reducing formation of a stagnant layer on the surface of the selectively permeable barrier.

SPECIFICATIONS

It is a principal object of the present invention to overcome a major drawback of existing automated or semi-automated techniques for chemical, microbiological, hematological or other analyses of blood or other body fluids, all of which depend upon extensive and time consuming manipulation of the body fluid for the purpose of separating it into the analytical sample or samples prior to presentation to an automated analytical machine or a skilled analyst. It is a further object of this invention to minimize the chances of error by providing a means for positive identification of the analytical sample with the patient from whom the body fluid was withdrawn.

To achieve the objects specified above and thereby relieve the shortage of skilled physicians and allied health personnel it is a further object of the present invention to provide a device for collecting a body fluid and automatically producing an analytical sample therefrom, which sample is formed without first removing the collected body fluid from the collector device and in general without manipulation by the collecting physician or allied health worker. A particularly useful application of the present invention is as a disposable device for collecting a portion of blood or other body fluid and automatically producing a sample of serum, plasma, protein free filtrate, or other fraction by automatic processing of the collected body fluid as it is being transported from the patient to the laboratory. Such automatic processing can include filtration, fluid flow through a selectively permeable barrier or barriers, and/or reaction with selected chemical reagents.

A second particularly useful application of the present invention is as a disposable device for collecting a portion of blood or other body fluid and automatically producing a concentrated sample of microorganisms for microbiological analysis and a separation of microorganisms of different size such as bacteria, rickettsia, and viruses by automatic filtration of the collected body fluid through one or more selectively permeable membranes or porous separators for individual analysis.

It is a further object of the present invention to reduce the dangers of laboratory induced infection when dealing with potentially pathogenic body fluids by providing a self contained system for body fluid collection and analytical sample separation.

It is a further object of the present invention to provide a body fluid collector and analytical sample separation means which is extremely simple in construction, automatic in operation and relatively inexpensive to manufacture whereby the device may be discarded after a single use.

Another object of the present invention is to provide a releasable sample cup designed to be marked with a pencil or other writing instrument or label to directly identify the body fluid and the analytical sample with the patient at the time the body fluid is collected from the patient and to carry such positive identification directly to automatic analytical instrumentation where so applied, by being designed to fit the turntable or other sample container holder of such automatic analytical instrumentation.

These and other objects and advantages are provided by a body fluid collector and analytical sample separator device including an evacuated body fluid collecting tube, an especially designed evacuated analytical sample cup releasably secured to one end of the collecting tube, one or more sample separating, selectively permeable barriers forming a passage between the tube and cup, means in said collecting tube for expediting the separation of the analytical sample by eliminating or substantially reducing formation of a stagnant layer on the surface of the selectively permeable barrier, and means forming a conduit for directing a body fluid into the other end of the body fluid collecting tube.

The invention will be more particularly described in reference to the accompanying drawings wherein:

FIG. 3 is an enlarged view substantially on line 3—3 of FIG. 1;

FIG. 4 is a section on line 4—4 of FIG. 3;

FIG. 5 is an enlarged fragmentary sectional view of a modified form of closure means for a device of the type illustrated in FIG. 1;

FIG. 6 is an enlarged partial fragmentary exploded view of another version of the body fluid collector and analytical sample separator provided with a series of selectively permeable barriers in such a manner that several different analytical samples can be obtained;

Figure 2:
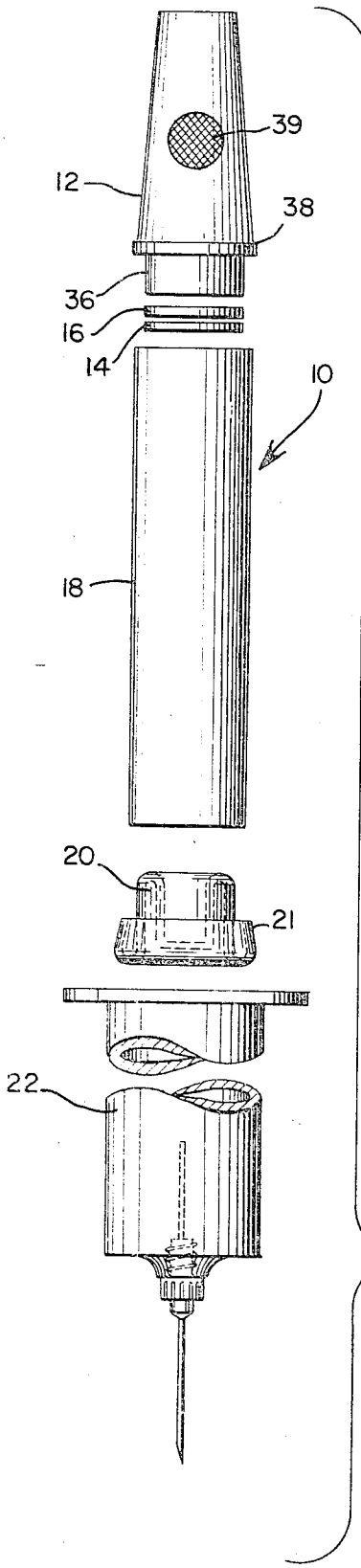
FIG. 2 is an enlarged partial fragmentary exploded view of the structure shown in FIG. 1.

Referring to the drawing 10 generally designates an improved diagnostic body fluid collector and sample separator. Beginning at the rear end of the device it includes an analytical sample cup 12, a porous support 16, a selectively permeable barrier disc 14, a collector tube 18, and a resilient stopper 20. This unit, when in use, is assembled with a barrel member 22, a double ended needle 24, and a needle holder 26. Each of the foregoing elements will be more particularly described hereinafter.

Referring particularly to FIG. 3 of the drawings, the sample collecting tube 18 consists of a generally cylindrical member having an internal flange 30 adjacent one of its ends. The tube 18 is preferably formed of a transparent or translucent plastic material and in the case of a blood collecting device the tube 18 would be approximately 4" long and have an internal diameter of about ¾". The upper or front end 32 of the tube 18 receives a conventional resilient rubber stopper 20 of the type adapted to be punctured by the inner sharpened end 34 of the double ended hollow needle 24.

The analytical sample receiving cup 12 is also cast or injection molded of plastic and its upper end, as viewed in FIG. 3, is provided with a flange 38. A portion 39 of the outer surface of the analytical sample cup 12 is provided with a roughened surface or other suitable surface for marking with a pencil or other writing instrument, or for application of a label to permit identification of the sample with the patient at the time the body fluid is collected. This identifying mark or marking can include a magnetic label or other designation capable of being interpreted by a computer or computer input device. The external diameter of the upper end of the sample cup 12 is such that it is snugly receivable within the bore 40 in the collector tube 18 and the upper surface of the flange 38 is adapted to abut against the lower peripheral edge of the tube. The atmosphere inside the tube 18 and the cup 12 is maintained, prior to use, at an absolute pressure of from about 0.5 to about 5 inches of mercury. The lower surface of the flange 38 and the outer diameter of the sample cup 12 below the flange are designed so that the cup can be inserted into a hole in a turntable or other sample container holder of automated analytical equipment, and will be retained by the flange 38. This portion of the assembly also includes, as hereinbefore described, a selectively permeable barrier disc 14 and a porous support disc 16. The upper surface, as viewed in FIG. 3, of the selectively permeable barrier disc 14 shoulders against the internal flange 30 and the peripheral edge of the porous support 16 also as viewed in FIG. 3, is fitted snugly against the bore 40 in the collector tube 18 whereby the porous support and the selectively permeable barrier disc are immovably maintained within the lower portion of the bore 40 in the sample receiving tube 18. The lower peripheral surface of the porous support disc 16 is seated against the upper edge of the cup 12.

Figure 1:
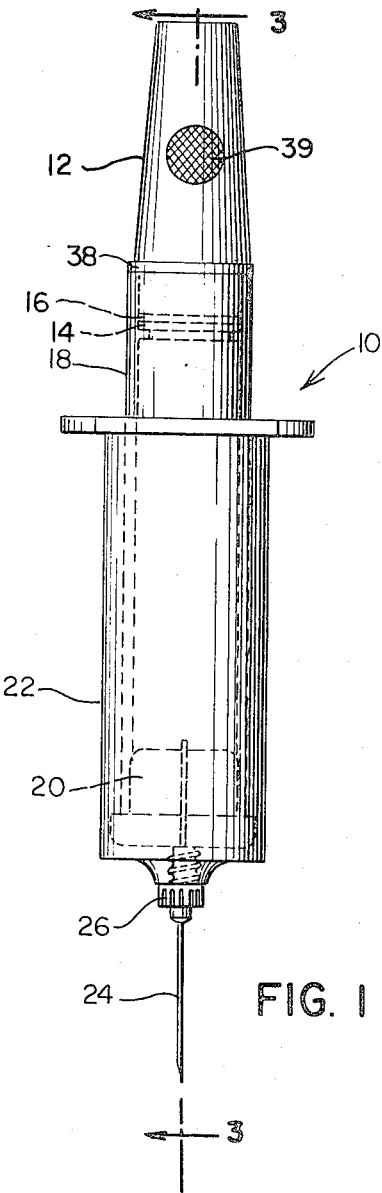
FIG. 1 is an assembled view of one version of the body fluid collector and analytical sample separator device of the invention.

The barrel member 22, as shown in FIGS. 1 and 2 of the drawings, is of generally conventional design and is of the type adapted to be used with vacuum blood sampling tubes. The lower end of the barrel member 22 is closed except for a threaded bore which receives the threads 44 on the needle retaining member 26. When the threads 44 of the member 26 are screwed into the end of the barrel portion 22 the double ended needle projects outwardly and inwardly generally as illustrated in FIG. 2 of the drawings. The internal diameter of the barrel member 22 is such that the outer cylindrical surface of the resilient rubber stopper member 20 snugly engages the inner surface, and once the barrel portion 22 is positioned such that the lower extended end 44 of the needle 24 is within a patient's vein, telescopic movement of the sample collector tube 18 inwardly of the barrel portion 22 such that the inner portion 34 of the needle 24 pierces the resilient stopper 20, as illustrated in FIG. 3 of the drawings, blood is drawn from the patient into the sample collecting tube 18 by a vacuum produced within the tube during its manufacture and/or assembly.

After the collecting tube 18 is filled with the desired quantity of blood from the patient, the tube may be removed from the barrel portion 22 and placed in a storage rack with the sample cup 12 pointing downwardly. At this stage the stopper 20 is removed from the end 32 of the tube 18 or is vented so that atmospheric pressure will assist in forcing a part of the collected blood through the filter or other selectively permeable barrier. When the device is used for microbiological applications the original stopper is replaced with a cotton plug or other protective closure to prevent contamination of the body fluid with additional microorganisms. During this process a portion of the blood such as serum, plasma or other analytical sample, will be drawn through the selectively permeable barrier 14 and the porous support 16 into the sample cup.

After the analytical sample has collected in the sample cup 12, the sample cup 12 may be removed from the tube 18 at the telescopic connection between these two elements.

The type of selectively permeable barrier, or filter, that is employed in the collector is determined by the nature of the fluid being filtered and the type of filtrate desired. In general, there are two classes of filters which can be used advantageously in the diagnostic collection and separation of blood. The two general classes comprise:

(1) microporous membrane filters and,
(2) thin skin diffusion membrane filters.

The first group, microporous membrane filters, are well known in commerce and have been used in many types of analytical chemistry procedures and for clarifying liquids, purifying air supplies, and pasteurizing beer by the removal of yeast particles therefrom. Although a variety of polymers can be used to fabricate such filters, the majority of the commercial microporous membranes are made of cellulose derivatives, especially cellulose diacetate and triacetate. A wide range of pore size is commercially available and the pore size range of microporous membrane filters are generally from about 0.22 to about 10 microns.

In addition to the polymer microporous membrane filters discussed above, microporous metal filters, sintered ceramic and sintered glass filters may also be employed in the device of the invention.

In order to exclude blood cells from the serum or other sample, a microporous membrane filter must have a pore size small enough to retain cells approximately 5 to 8 $\mu$ in diameter and yet large enough to permit relatively rapid flow of the liquid analytical sample. Where blood plasma is to comprise the filtrate, a flow time for 3 mls. of sample in the neighborhood of about 20 minutes has been obtained with a microporous membrane filter disc of approximately ¾" diameter.

In the alternative version of the device to be used to prepare samples for microbiological analysis, several microporous membrane filters are arranged in series as shown in FIG. 6 so that large malignant cells are retained by the first filter 61, erythrocytes, leukocytes and platelets are retained by the second filter 62, and bacteria are retained by the third filter 63. If desired, rickettsia would be retained by a fourth filter and viruses by a fifth filter. A greater or lesser number of filters are used as appropriate for the application. The filters are held by flanged plastic cylinders 65 releasably secured to the body fluid connecting tube 18, the sample cup 12, and to each other such that each forms a sample chamber when removed from the assembly. These chambers are designed in such a way that the sample of microorganisms can be transferred directly to the appropriate culture medium for growth and analysis.

The thin skin diffusion membrane filter differs from microporous varieties in that the membrane filter has a thin, unbroken skin on one surface and graded porosity through the body of the filter material. Such membranes have been used for the reverse osmosis processes used for desalination of sea water and a number of methods of making such membranes have been described in the technical literature.

The thin skin diffusion membrane filters have advantages when used with the structure of the present invention as there are no pores on the surface of the skin which could become clogged by red cells or protein molecules. Furthermore thin skin diffusion membrane filters can be made with selective permeability based on the molecular weight and/or other physico-chemical properties of the components of the body fluid sample. The thin skin diffusion membrane used in the device is appropriately selected to be permeable to the component or components of the body fluid which are sought in the analysis of the sample. For example, a thin skin diffusion membrane permeable to species with molecular weight less than 200,000 is used to separate fibrinogen and all other higher molecular weight constituents from blood for the preparation of serum using the present device. In cases where it is desired to obtain several analytical samples each containing different sets of constituents then the form of the device illustrated in FIG. 6 is used with appropriately selected thin skin diffusion membrane filters. Another version of the device incorporates a series of selectively permeable barriers some of which are microporous membrane filters and some of which are thin skin diffusion membrane filters. For example, a device designed to separate malignant cells, normal blood cells, and a protein free filtrate from blood, includes two selectively permeable barriers in series. The first such barrier is a microporous membrane filter with pore size of approximately 10 microns which retains malignant cells and transports other constituents. The second barrier is a thin skin diffusion membrane filter permeable to those constituents of blood with colecular weight less than approximately 10,000, which retains normal blood cells and proteins and transports electrolytes, glucose, urea, and other low molecular weight constituents.

It will also be appreciated by those skilled in the art that where higher flow rates are desired the disc shape filter 14 may be replaced by a dished, conical or cup shaped filter which would be maintained within the structure by, for example, the flange means illustrated in FIG. 3.

Referring for example to FIG. 5 of the drawings, a modified form of stopper is illustrated. In FIG. 5 the stopper 50, which may be constructed of plastic, synthetic or natural rubber or the like, is provided with an opening 52 therethrough which opening is adapted to snugly receive a resilient elastomeric closure member 54. The closure member 54 has a thin cross web 56 through which the sharp end 34 of the needle 24 may be readily pressed and, once the tube 18 is filled with blood, the entire resilient closure member 54 may then be removed as shown in broken lines at A, to vent the interior of the tube 18 to atmospheric pressure. It will also be noted that in the illustrated form of the stopper 50 the resilient closure member 54 is positioned off center. The needle 24 in the needle holding barrel member 22 would also be positioned off center and can thereby be inserted at an acute angle to, for example, the arm of the patient. A protrusion 57 on the rim of the stopper 50 opposite to the closure member 54 facilitates the alignment of the off center needle 24 with the off center closure member 54 by sliding in a groove provided in the barrel member 22.

Figure 8:
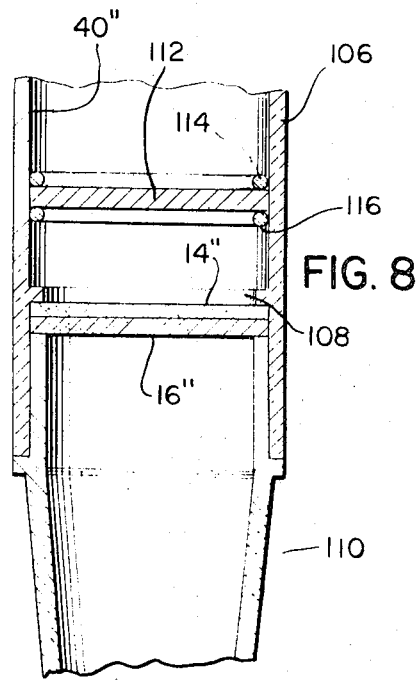
FIG. 8 is a view similar to FIG. 6 showing another form of means for expediting sample separation.
Figure 9:
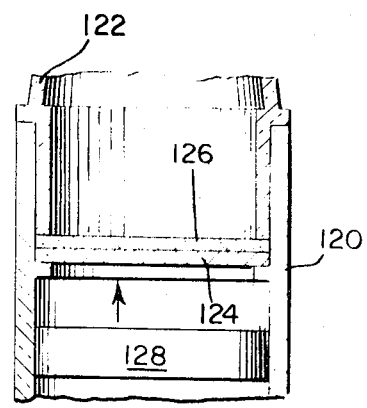
FIG. 9 illustrates yet a further form of means for expediting sample separation.

When the improved collector and sample separator is employed to separate red cells and other components from, for example, a blood sample it has been found that the filtration rate of the device can be materially improved by the inclusion in the structure of means to prevent degradation of the flow rate by clogging of the pores of the filter or formation of a stagnant layer on the filter or on the thin skin membrane. While a number of means may be employed, within the scope of the invention, to expedite separation of the analytical sample by preventing formation of a stagnant layer or clogging of the filter, certain of such means are illustrated in FIGS. 7, 8 and 9 of the application drawings.

Figure 7:
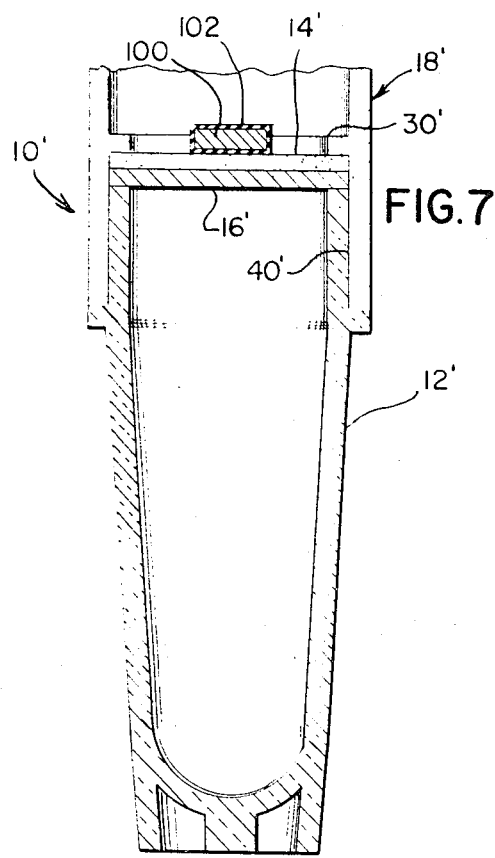
FIG. 7 is a fragmentary sectional view of a further modified form of the invention showing means for expediting sample separation.

Referring to FIG. 7 of the drawings one form of means for preventing degradation of the flow rate of the filter is illustrated. In FIG. 7 the separator tube 18' is formed and constructed substantially the same as the separator tube illustrated in FIGS. 1 through 4. The lower end of the separator tube is provided with an internal flange 30' which forms a seat for a portion of the upper surface of filter disc 14'. Filter disc 14' is maintained in its illustrated position by filter support 16' which is held in its illustrated position by friction fit in the bore 40' of separator tube 18'. The upper surface of the filter 14' is maintained relatively free of blood cells, protein matter and the like by an electromagnetic stirrer which includes a magnetic susceptible member 100 which may be provided with a nylon or Teflon jacket 102. The magnetic susceptible stirred 100 is free to move upon the upper surface of the filter disc 14' and is urged in a rotating or orbital path by a conventional commercial magnetic stirring driver mechanism which may be incorporated into the transporting rack for the collector and sample separator 10'.

Degradation of the flow rate by clogging of the pores of the filter member also may be reduced or prevented by clotting of the blood on a prefilter positioned above the filter membrance as the assembly. Structures for carrying out this aspect of the invention are illustrated in FIG. 8. The colector tube 106 is provided with an internal flange 108 and a separator cup or filtrate cup 110 maintains the filter disc 14'' and the filter disc support member 16'' in contacting relationship therewith as described in reference to the other forms of the invention. A relatively coarser prefilter disc 112 is positioned above the upper surface of the filter disc 14'' by, for example, a pair of resilient retaining rings 114 and 116 which engage the internal cylindrical surface 40'' of the collector tube 106 and the upper and lower faces of the coarse filter 112. The prefilter 112 is, as hereinbefore described, provided with larger pores and/or a large surface area and the larger particles of the whole blood or clotted blood will collect on this surface preventing the entrapped cells from reaching the fine or membrane type filter 14'' thereby reducing degradation of the flow rate through the device. With structures of the type described above and illustrated in FIG. 8 the collected sample of blood may be induced to form clots and thus entrap the blood cells by the introduction of a clotting agent into the collected sample at the time the collector tube 106 is vented to atmospheric pressure. Similarly, the blood cells may be induced to form aggregates by introduction of a hemagglutinin into the collected sample. The hemagglutinin and/or clotting agent may be introduced by coating the prefilter 112 with these agents, which will dissolve into the collected sample. A particularly useful hemagglutinin has been found to be derived from plants, and especially from the seeds of legumes, such as kidney beans. This hemagglutinin, obtained by leaching kidney beans with aqueous saline solution, is a member of the class phytohemagglutinins, also known as lectins. A prefilter in the form of a column of plastic granules coated with such lectin has been found to expedite the separation of an analytical sample of plasma from blood by formation of aggregates of red cells which adhere to the plastic granules.

Figure 10:
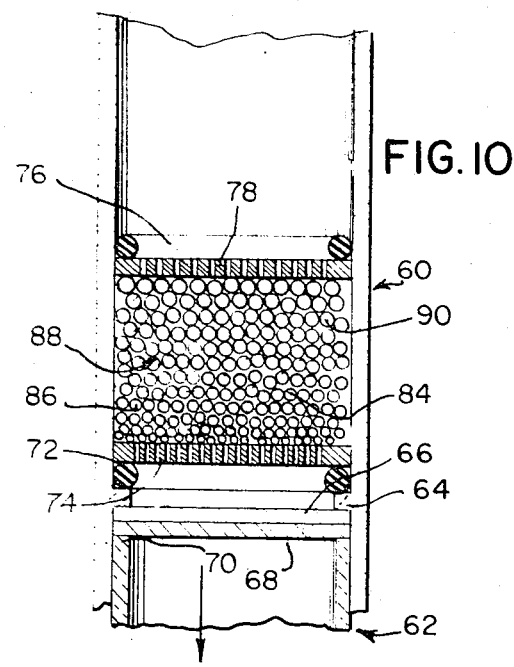
FIG. 10 illustrates another form of means for expediting sample separation.

The above described prefiltering and prefiltering and clotting may be carried out in an assembly such as illustrated in FIG. 10. Referring to FIG. 10, 60 generally designates the lower portion of a separator tube and 62 generally designates the upper end of the sample cup. The separator tube 60 is provided with an internal flange 64, the lower surface of which engages the upper radial edge of the filter disc 66. The filter disc 66 is maintained in its position of contact by support member 68, the lower radial edge of which is engaged by the peripheral edge 70 of the sample cup 62.

Above the upper surface of the filter disc is positioned, for example, an O-ring 72 which supports a perforated plate 74.

A further O-ring 76 and perforated plate 78 are positioned above the aforementioned O-ring and plates 72 and 74. The space between the pair of plates 74 and 78 is filled with inert solid granules such as small glass beads generally designated 88.

As illustrated, the glass beads at the upper end 90 may be larger than those at the lower end 86 and the beads may be coated with a clotting agent 84.

Another technique for reducing degration of flow rate through the selectively permeable barrier is to position the assembly such that the filtrate cup is abve the separator tube during the time when filtration occurs. This will allow sedimentation of the red cells in the direction away from the surface of the filter thus helping to alleviate sludge formation. A structure suitable for carrying out this technique is illustrated in FIG. 9 wherein 120 designates a separator tube, 122 designates the analytical cup, 124 defines the filter and 126 the filter support. The assembly also includes a follower plug 128 which may comprise or be substituted for the stopper 20 illustrated in the form of the invention shown in FIGS. 1 through 5 or the follower 128 may be an independent element inserted in the tube at the time the tube is vented to atmospheric pressure.

In operation of the form of the invention illustrated in FIG. 9 a sample of blood is withdrawn from the patient into the tube member 120 in the manner described in reference to FIGS. 1 through 5 of the drawings. After the desired quantity of the sample is obtained the device is vented to the atmosphere while the cup portion 122 is maintained in a downward direction.

Following venting of the device to the atmosphere the follower 128 is inserted in the open upper end of the tube 120 and the unit consisting of tube 120, separator cup 122 and follower 128 is inverted with the upper end of the tube 120 placed in a downward direction in a holding rack so that the device is positioned as illustrated in FIG. 9. Suction or the reduced pressure existing in cup 122 draws the blood sample to be filtered upwardly through the filter 124, the filter support 126 and at the same time the follower 128 is urged toward the filter 124. While the filtration is taking place sedimentation will allow the heavier particles and blood clots to migrate towards the inner circular surface of the follower 128 freeing the filter surface from such clogging material. The stopper 20 illustrated in FIGS. 2 and 3 can be used as a follower by folding its outer peripheral edge 21 away from the collector tube 18 and pushing the stopper into said tube instead of venting the contents of the tube to the atmosphere.

In addition to the foregoing means to reduce or prevent degradation of the flow rate of the filter member specifically described hereinabove it will be appreciated that the filter might be maintained at a more uniform flow rate condition by the provision of an electric or magnetic field maintained perpendicular to the surface of the filter which would tend to move the red cells away from the filter surface it would occur because of electrophoresis and in the case of anisotropic magnetic field migration of the red cells away from the filter surface it would occur because of the paramagnetism of the hemoglobin in the red cells.

From the foregoing description of a preferred and of a modified form of the body fluid collector and separator of the present invention, it will be seen that the objects and advantages hereinbefore set forth are fully accomplished. It will be appreciated that body fluid, the permeable barier and the analytical sample may be selected for clinical chemical analysis; microbiological analysis; hematological analysis, or cytological analysis.

I claim:
1. A body fluid collector and analytical sample separator device including a pair of releasably connected evacuated tubes, a sample separating permeable barrier positioned between the pair of tubes, and means for reducing degradation of the flow rate of the separating barrier.

2. The invention defined in claim 1 including a series of barriers and wherein said barriers are comprised of both microporous membranes and thin skin diffusion membranes.

3. The invention defined in claim 1 wherein said pair of tubes includes a collector tube and an analytical sample tube, and a fluid follower is slidably mounted in said collector tube.

4. The invention defined in claim 1 wherein said pair of tubes includes a collector tube and an analytical sample tube and wherein said permeable barrier includes a plurality of spaced permeable barriers releasably secured to the collecting tube, the sample tube, and each other such that several analytical samples are separated from the collected body fluid.

5. The invention defined in claim 1 wherein one of said tubes comprises an analytical sample cup and said analytical sample cup is provided with a label receiving surface.

6. The invention defined in claim 1 wherein the body fluid, permeable barrier, and analytical sample are selected for clinical chemical analysis.

7. The invention defined in claim 1 wherein the body fluid, permeable barrier, and analytical sample are selected for microbiological analysis.

8. The invention defined in claim 1 wherein the body fluid, permeable barrier, and analytical sample are selected for hematological analysis.

9. The invention defined in claim 1 wherein the body fluid, permeable barrier, and analytical sample are selected for cytological analysis.

10. The invention defined in claim 1 wherein said means for reducing degradation of the flow rate of the permeable barrier comprises a stirrer adapted to wipe the surface of the permeable barrier member.

11. The invention defined in claim 10 wherein said stirrer comprises a magnetic susceptible element.

12. The invention defined in claim 1 wherein the means to reduce degradation of the flow rate of the filter comprises a prefilter positioned in one of the tubes and having a multiplicity of channels, at least some of said channels having a greater flow rate than the separating barrier.

13. The invention defined in claim 12 wherein the prefilter comprises a column of inert solid granules.

14. The invention defined in claim 13 wherein the granules are coated with a clotting agent.

15. The invention defined in claim 14 wherein the coating consists of a hemagglutinating agent selected from the class of lectins.

References Cited
UNITED STATES PATENTS

| | | | |
|---|---|---|---|
| 3,300,051 | 1/1967 | Mitchell | 210—339 |
| 3,322,114 | 5/1967 | Portnoy et al. | |
| 3,448,041 | 6/1969 | Swank | 210—335 XR |

MORRIS O. WOLK, Primary Examiner

R. M. REESE, Assistant Examiner

U.S. Cl. X.R.

23—230; 210—314, 335